P. WAYDA.
STEERING DEVICE.
APPLICATION FILED JUNE 27, 1917.
1,390,322.
Patented Sept. 13, 1921.
2 SHEETS—SHEET 1.
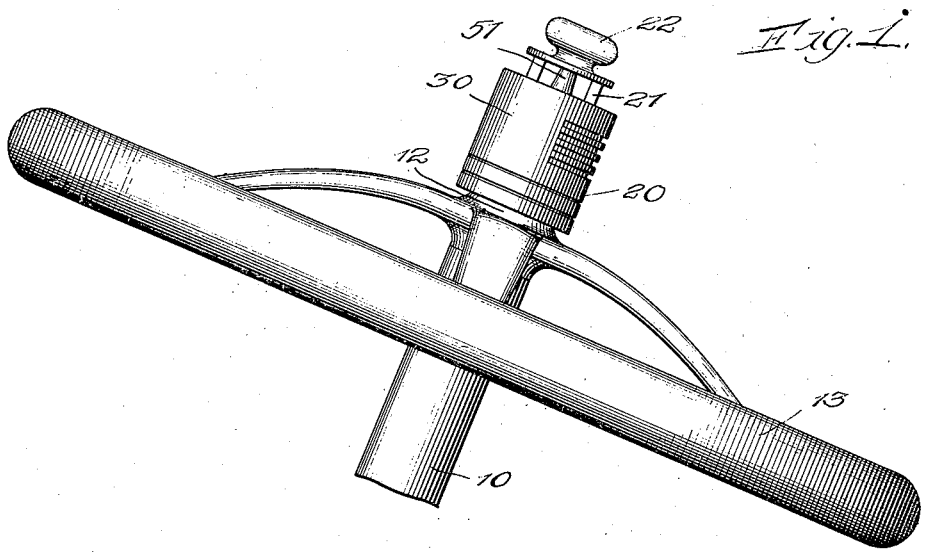
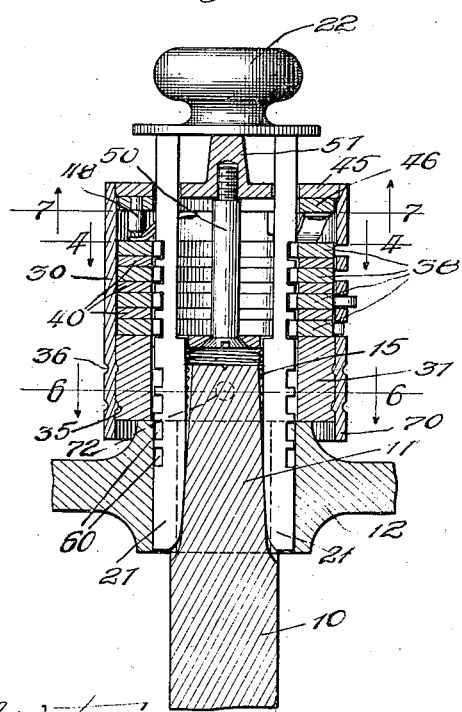
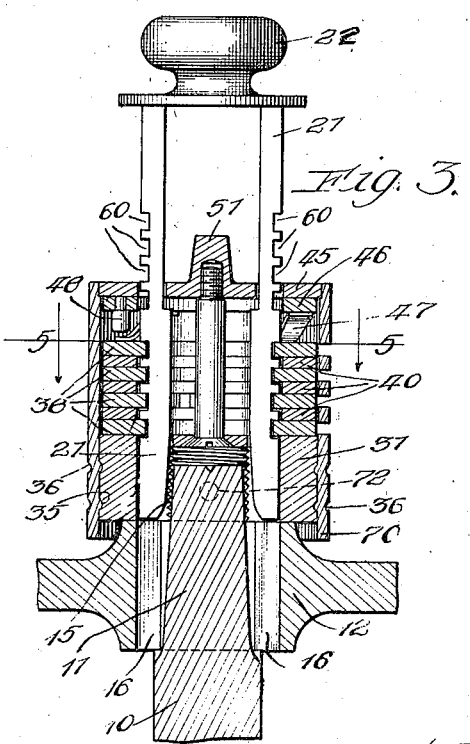
Inventor,
Peter Wayda

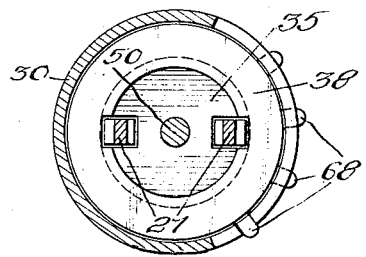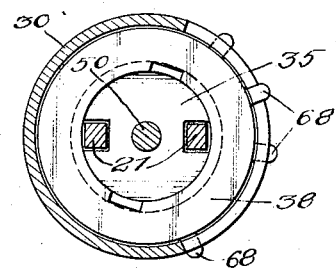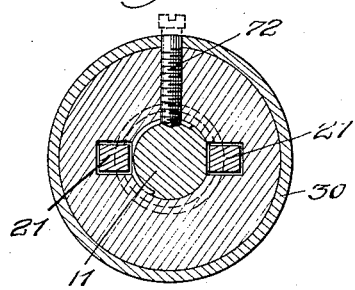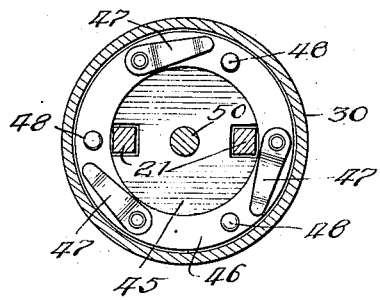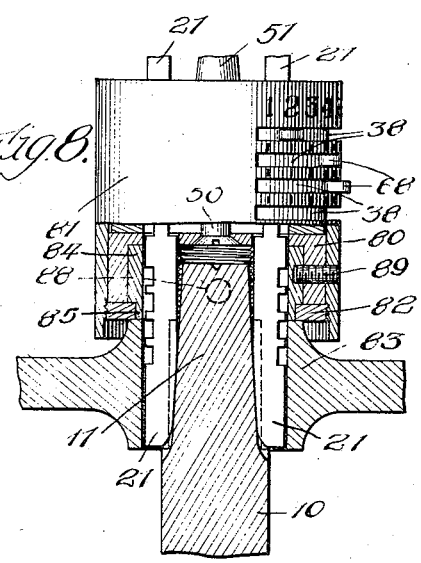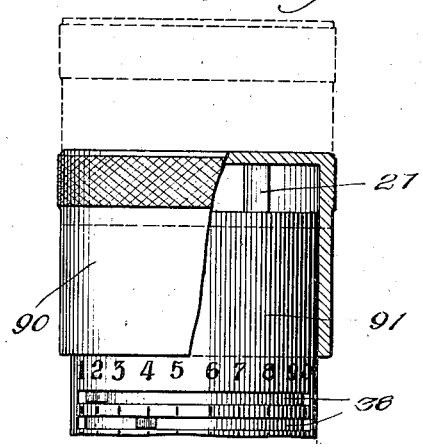

UNITED STATES PATENT OFFICE.

PETER WAYDA, OF AURORA, ILLINOIS, ASSIGNOR TO LEOPOLD MOSS, OF CHICAGO, ILLINOIS.

STEERING DEVICE.

1,390,322.   Specification of Letters Patent.   Patented Sept. 13, 1921.

Application filed June 27, 1917. Serial No. 177,198.

*To all whom it may concern:*

Be it known that I, PETER WAYDA, a citizen of the United States, residing in Aurora, in the county of Kane, in the State of Illinois, have invented new and useful Improvements in Steering Devices, of which the following is a specification.

This invention relates to improvements in steering devices for automobiles and more especially to an attachment adapted for use in connection with a steering wheel of an automobile or similar machine to render the wheel inoperative and thus prevent the machine from being properly steered if an attempt is made to steal it.

A device embodying the principles of the invention is illustrated in the accompanying drawings in which:

Figure 1 is a view in elevation showing a complete steering wheel with the device in place. Fig. 2 is an axial section through the theft preventing device. Fig. 3 is a similar view showing the parts of the device in an altered position. Fig. 4 is a radial section through the device on the line 4—4 of Fig. 2. Fig. 5 is a similar section on the line 5—5 of Fig. 3. Fig. 6 is a similar section on the line 6—6 of Fig. 2. Fig. 7 is a similar section on the line 7—7 of Fig. 2 looking upward as indicated by the arrows. Fig. 8 is a view in elevation and partly in axial section showing a modified form of the device. Fig. 9 is a view in elevation with parts broken away showing another modified form of the device.

As shown in said drawings, in Figs. 1 to 7 inclusive, 10 indicates the upper part of the steering post of an automobile having a portion 11 at its end reduced in diameter to engage in an opening in the hub 12 of a steering wheel 13. These parts are here shown in well-known form and their particular construction as herein illustrated is not a part of the present invention. The reduced part 11 of the steering post is also made of such length as to extend above the hub of the wheel and the projecting part 15 is threaded to receive a nut which ordinarily holds the wheel in place; and the wheel is fixed against rotation with respect to the post by means of feathers or keys engaging in keyways 16 (Fig. 3).

In the practice of this invention the nut which ordinarily secures the wheel in place is removed and also the keys and for them is substituted my improved locking device indicated in its entirety at 20, the device being in effect a large nut which screws down upon the threads 15 and embodies in its construction a pair of sliding bolts 21, which are arranged for movement downward or upward through a knob 22 at their upper ends, to engage in the keyways and thus fix the wheel against rotation on its post 10, or to free it and allow it to turn ineffectively on the post and thus render the steering gear inoperative; the bolts being locked in either position by a permutation device within the part 20.

More particularly described these parts are as follows: The lock 20 comprises a hollow cylinder 30, into the bottom of which is fitted a thick head 31 which is made with a threaded opening into its center to screw down upon the threads 15 of the steering post. In the construction of these parts the head 31 is made with a pair of annular grooves 35 and after the head is fitted into place in the shell 30 the metal of the latter is pressed down into these grooves as indicated at 36 to hold the parts together. Above the head 31 are arranged a series of annular disks 38, which are separated by alternately arranged spacing disks 40. The upper end of the cylinder 30 is closed by a circular head 45 beneath which is arranged a ring 46. To this ring are fixed a number of flat springs 47 which bear yieldingly upon the disks 38 and provide a small amount of frictional engagement between them; and in addition the ring 46 is provided with downwardly projecting posts or studs 48, which prevent the upward sliding movement of the disks 38 against the action of the springs. The head 45 is fixed in place by a large screw 50 which extends upward through the center of the lower head 31 and is threaded into a boss 51 in the center of the head 45.

On the outer edge of each of the two bars 21 are made two series of notches 60 corresponding to the relative distances between the disks 38; and at two diametrical points in the inner periphery of each ring 38 are made corresponding notches, so that when the disks 38 are turned into a certain angular position with respect to each other their notches will be in line and the bars 21 free to slide upward or downward; and when the bars are either in their upper or their lower position the disks 38 may be turned so that their notches fall out of line and the bars 21 are then locked in position.

For the proper manipulation of the disks 38 each of them is made with a short radial projection 68 which extends through a radial slot in the cylindrical shell 30, and to permit the assembling of the parts the projections 68 are made short enough and thin enough so that the disks can be inserted into the shell 30 and the projections 68 fitted into the slots from within.

The shell 30 is also made of such length as to extend downward below the lower head 31 as indicated at 70, so that when the device is in place it will be difficult to insert tools which might be used to force the shell and the head 31 apart.

The device is fixed in place upon the upper end of the post 10 by screwing it down upon the threads 15, as above described, and then locked by a set-screw 72, which may afterward be sawed off so that it cannot be unscrewed.

In Fig. 8 is shown a modified form of the device which is made similar in all respects to that above described except that in place of the lower head 31 there is substituted a lower cylinder head of somewhat different form. The latter comprises a wide ring 80 which is inserted into the lower end of a cylinder 81. In attaching the device to the steering post after removing the ordinary steering post nut and the feathers or keys, a ring 82 having threads on its outer periphery is first dropped into place upon the hub 83 of the steering wheel, and next a thick circular plate 84 with a threaded opening through its center is screwed down upon the steering post. The plate 84 is made all around with a downwardly depending flange 85 which meets the ring 82 and holds the latter in place; and when these parts have been thus secured in position the shell 81 is screwed down upon the ring 82 and the entire device locked in place by a set-screw 88.

In Fig. 9 is shown a form of the device similar in all respects to that shown in Figs. 1 to 7 except that in place of the knob 22 joining the upper ends of the two sliding bars 21, the latter are fixed at their upper ends into the circular head of an outer cylinder 90, which telescopes down over the shell or cylinder 91 of the lock, when the two bars are pushed downward to fix the wheel on its post, or may be raised into the position shown in the dotted lines to withdraw the two bars from engagement in the hub of the wheel.

I claim as my invention:

1. In a steering device, the combination of a steering post and a steering wheel on the end of the post with a threaded end of the post projecting above the wheel, a keyway between the hub of the wheel and the steering post, a lock adapted for engagement with the threaded projecting end of the steering post, means to fix the lock in place, and a sliding bolt in the lock adapted to enter the keyway and to be withdrawn therefrom whereby the wheel may be fixed against rotation on the end of the steering post or may be released therefrom.

2. In a steering device, the combination with a steering post and a steering wheel on the end of the post, the post projecting above the wheel, of a locking device fixed on the projecting end of the steering post, a keyway between the hub of the wheel and the steering post, a sliding bar in the locking device adapted to extend downward into the key-way and to be withdrawn therefrom, a notch in the sliding bar and an adjustable disk in the locking device with a corresponding notch whereby the disk may be turned to permit the bar to slide in its notch or may be turned to lock the bar against movement.

3. In a steering device, the combination with a rotatable steering post, having its end reduced in diameter and threaded, a steering wheel having an opening in its hub to engage on the reduced end of the post, a key-way between the wheel-hub and the post adapted to receive a key, the threaded end of the post projecting beyond the wheel and having a lock mounted thereon, and a sliding bolt controlled by said lock adapted to enter the key-way and fix the wheel against rotation on the post, and to be withdrawn from the key-way to permit the wheel to rotate freely on the post.

In witness whereof, I have hereunto subscribed my name this 25th day of June, 1917.

PETER WAYDA.